(12) United States Patent
Hoheisel

(10) Patent No.: US 6,828,562 B2
(45) Date of Patent: Dec. 7, 2004

(54) SOLID-STATE RADIATION DETECTOR AND MEDICAL EXAMINATION AND/OR TREATMENT DEVICE

(75) Inventor: Martin Hoheisel, Erlangen (DE)

(73) Assignee: Siemens Aktiengesellschaft, München (DE)

(*) Notice: Subject to any disclaimer, the term of this patent is extended or adjusted under 35 U.S.C. 154(b) by 231 days.

(21) Appl. No.: 10/176,292

(22) Filed: Jun. 20, 2002

(65) Prior Publication Data

US 2003/0010921 A1 Jan. 16, 2003

(30) Foreign Application Priority Data

Jun. 20, 2001 (DE) .......................................... 101 29 763

(51) Int. Cl.⁷ .................................................. G01T 1/24
(52) U.S. Cl. ........................... 250/370.07; 250/370.09; 378/51; 378/91
(58) Field of Search ...................... 250/370.07, 370.09; 378/51, 91

(56) References Cited

U.S. PATENT DOCUMENTS 5,598,004 A    1/1997  Powell et al.

6,489,619 B2 * 12/2002  Street .................... 250/370.09

OTHER PUBLICATIONS

Patent Abstracts of Japan Publication No. 2000111652 A, Apr. 21, 2000 for Application No. 10/278,931.

"Radiation Detectors, Physical Principles and Applications," Delaney et al (1992) pp. 299–311.

* cited by examiner

Primary Examiner—Constantine Hannaher
Assistant Examiner—Shun Lee
(74) Attorney, Agent, or Firm—Schiff Hardin LLP

(57) ABSTRACT

In a solid-state radiation detector and a medical examination and/or treatment device having such a solid-state radiation detector, the detector has a pixel matrix, with each pixel supplying an output signal dependent on the incident radiation. The pixel matrix has a conversion layer that converts the incident radiation into charge, a storage capacitor for storing the charge and a transistor for reading out the charge. The capacitance of the storage capacitor is set to be so small that because of the voltage drop across the storage capacitor, the output signal of the pixel exhibits, starting from a specific value of the incident radiation dose, a sublinear response with reference to the radiation dose.

9 Claims, 1 Drawing Sheet

SOLID-STATE RADIATION DETECTOR AND MEDICAL EXAMINATION AND/OR TREATMENT DEVICE

BACKROUND OF THE INVENTION

1. Field of the Invention

The present invention relates to a solid-state radiation detector of the type having a pixel matrix that supplies an output signal dependent on the incident radiation, having a conversion layer for converting the incident radiation into charge, a storage capacitor for storing the charge and a transistor for reading out the charge, as well as to a medical examination and/or treatment device with such a solid-state radiation detector,

2. Description of the Prior Art

Use is increasingly being made in X-ray technology of digital solid-state radiation detectors, also termed matrix detectors, that are distinguished chiefly by a linear response. This means that the output signal supplied by the detector or by the respective pixel, i.e. an image point, is proportional over very wide ranges to the incident X-ray and radiation dose. However, the design imposes a maximum radiation dose, which if exceeded causes the detector to suddenly reach its limitations. The reason for this can reside in the analog signal processing or with the downstream analog-to-digital converter that converts the analog output signals of the pixels into digital signals. This response is unfavorable, since the aforementioned abrupt transition can lead to artifacts in the X-ray images that are of course not desired.

Known solid-state radiation detectors for this reason usually are driven only at a low levels, for example at 5% to 10% of the maximum drive level, in order to avoid local overdriving due to brief high incident radiation doses as in the case of unattenuated radiation. However, for relatively low radiation doses, this disadvantageously results in a worsening of the signal-to-noise ratio, particularly when the quantization (step division) by the analog-to-digital converter cannot be neglected.

A solid-state radiation detector of this known (disadvantageous) type is disclosed in U.S. Pat. No. 5,598,004. For the same purpose of eliminating dynamic range limiting in the case of a two-dimensional radiation detector, JP Abstract 2000 11 16 52 A describes the connection of an external resistance between a biasing voltage supply and a biasing electrode of a semiconductor layer. Across this resistance a voltage drop occurs in the voltage at the biasing electrode, the result being a decrease in the electric field generated in the semiconductor, causing fewer charge carriers to be produced in the semiconductor. Reference may also be made to the publication by G. F. G. Delaney and E. C. Finch entitled "Radiation Detectors", Clarendon Press, Oxford 1992, pages 299□0311 as radiation detectors relating to the general prior art.

SUMMARY OF THE INVENTION

It is an object of the present invention to provide a solid-state radiation detector and a medical examination and/or treatment device with such a solid-state radiation detector wherein the aforementioned disadvantages of known detectors are avoided.

This object is achieved in accordance with the invention in a solid-state radiation detector of the type initially described wherein the capacitance of the storage capacitor is so small that because of the voltage drop across the storage capacitor, the output signal of the pixel exhibits, starting from a specific value of the incident radiation dose, a sublinear response with respect to the radiation dose.

At the conversion layer of a solid-state radiation detector of the type described above, a voltage is present having a magnitude that depends on the thickness of the conversion layer, usually a selenium layer, and which serves to separate the charges produced by the incident radiation, in relation to the active pixel matrix with the storage capacitor. This voltage is in the kV range, which lies above the field strengths at the conversion layer, for example in the range of 10 V/$\mu$m. Thus, with a layer thickness of, for example, 200 $\mu$m an applied voltage of approximately 2 kV is assumed for the purpose of achieving this field strength. The capacitance of the storage capacitor is selected in this case to be sufficiently large for known solid-state radiation detectors so that the voltage at the conversion layer always remains approximately equal to the externally-applied voltage.

The invention departs from this known design of the capacitance of the storage capacitor and, by contrast, reduces the capacitance of the storage capacitor $C_{i,j}$ so much that the change in voltage $dU=q_{i,j}/C_{i,j}$, which is caused by the signal charge $q_{i,j}$ at the pixel (i,j), is in the order of magnitude of the applied voltage. Thus a substantial fraction of the voltage drops across the storage capacitor, and the effective voltage $V_{eff}$ drop at the conversion layer, in particular in the case of high irradiated X-ray doses due to unattenuated radiation, for example, is reduced in accordance with the relationship $V_{eff}=V-q_{i,j}/C_{i,j}$, wherein V is the externally-applied voltage. Thus, specific use is made of the voltage divider properties of the combination of the conversion layer and the storage capacitor in order to produce an intended reduction in the effective voltage $V_{eff}$ across the conversion layer.

The ability to produce electron/hole pairs in the conversion layer, however, depends on the strength of the electric field across the conversion layer, the result generally being a linear relationship as described, for example, in the publication entitled "New Digital Detector for Projection Radiography" by Lee, Cheung, Jeromin, in Physics of Medical Imaging, Proc. SPIE No. 2432, pages 237 ff and in FIG. 8 there.

If the voltage drop across the conversion layer is now lowered because of the voltage drop across the storage capacitor, the effective field strength across the conversion layer also is reduced, necessarily resulting in fewer electron/hole pairs being generated and collected. Consequently, with an increasing X-ray dose the sensitivity of the solid-state radiation detector is reduced within an appropriate time, starting from a specific dose, before the end of the drive-level range so as to advantageously avoid a sudden limitation of the output signal. Because of the lower number of electrons collected, the originally linear response of output signal in relation to radiation dose is cancelled, and a sublinear response is produced in such a way that the output signal responds in a less than proportional fashion to the radiation dose.

The solid-state radiation detector according to the invention therefore permits a substantially higher drive level with particular advantage, since no overdriving will occur, due to the sublinear response and the lower sensitivity achieved even in the case of high incident doses, for example in the case of unattenuated radiation. The result is that a higher gain can be selected so that the output signals can be increased in the range of low doses, and a substantially improved signal-to-noise ratio thus is achieved.

In an embodiment of the invention the capacitance of the storage capacitor is selected so that the ratio of the maximum voltage drop across the storage capacitor to the maximum voltage dropping across the conversion layer is at least 1:10 or greater, in particular, at least 1:5 or greater. In any case, the voltage drop across the storage capacitor should be of essentially the order of magnitude of the voltage applied from outside. With a voltage of 2 kV, for example, at the conversion layer, the voltage dropping across the storage capacitor should be, for example, at least 500 V or even more.

If it is expected that the voltage drop across the storage capacitor will be very high, it is expedient in order to avoiding damage to the readout transistors, to design these readout transistors as high-voltage transistors so that they can switch voltages of several 100 V without their parameters being changed or damaged.

The conversion layer itself is expediently a selenium layer, the transistor is a thin-film transistor (TFT) based on amorphous silicon (a-Si), or is a high-voltage thinfilm transistor (HVTFT) based on a-Si. Such high-voltage thin-film transistors are known, for example, from the publication by Tuan in Materials Research Society Symposium Proceedings Vol. 70, page 651 ff from 1986.

In addition to the solid-state detector itself, the invention also relates to a medical examination and/or treatment device having at least one radiation source and at least one solid-state radiation detector of the type described above, as well as a processing device to which the output signals from the solid-state radiation detector are supplied, the processing device being designed to compensate for the sublinearity of the output signals, in order to provide a detector with a relatively large dynamic range. The compensation can be performed, for example, analytically by using appropriate analytical compensation means, or by using at least one look-up table in which appropriate compensation values are entered.

DESCRIPTION OF THE PREFERRED EMBODIMENTS

Figure 1:
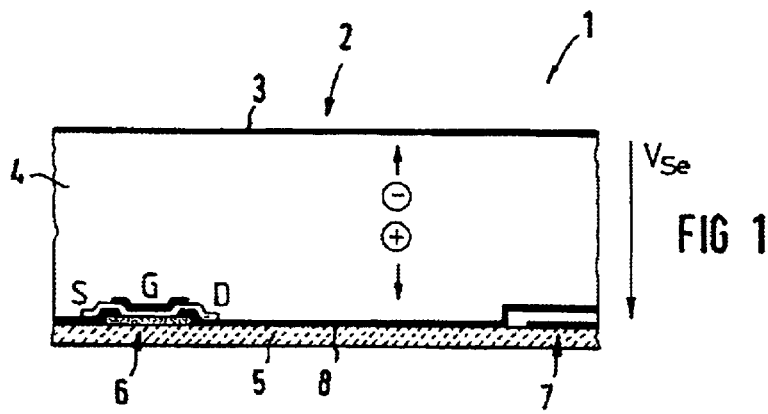
FIG. 1 illustrates the basic design of a pixel of a solid-state radiation detector according to the invention.

FIG. 1 shows a solid-state radiation detector 1 according to the invention, with a pixel 2 being specifically illustrated. Located below an upper electrode 3 is a direct conversion layer 4 in the form of a selenium layer of amorphous selenium. The pixel 2 further has a substrate 5 from which a thin-film transistor 6 is produced, preferably in the form of a high-voltage transistor (HVTFT). Also provided is a storage capacitor 7 that serves for storing charge that can be read out by the transistor 6 via a pixel electrode 8. The transistor 6 is connected to the storage capacitor 7 via its drain terminal D. Also shown are the gate terminal G and the source terminal S of the transistor 6.

Applied to the conversion layer 4 is a voltage $V_{Se}$ that serves to separate and move the holes or electrons produced in the conversion layer 4 upon exposure to radiation, as is illustrated graphically in FIG. 1. The charge collected at the pixel electrode 8 is stored in the storage capacitor 7 and read out as required via the transistor 6. The design of such a pixel is well known, as is its mode of operation (see J. Rowlands, S. Kasap, Amorphous Semiconductors Usher in Digital X-ray Imaging, in Physics Today, November 1997, pages 24 ff.).

Figure 2:
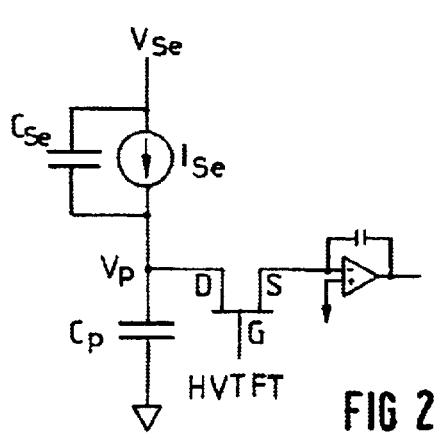
FIG. 2 shows an equivalent circuit of the pixel.

FIG. 2 shows the equivalent circuit diagram of a pixel, including the selenium layer capacitance $C_{Se}$, the capacitance of the storage capacitor $C_p$ and the thin-film transistor.

If the voltage $V_{Se}$ is now applied to the conversion layer 4, this leads to a charging current $I_{Se}$ and thus to a voltage drop across the conversion layer.

In the solid-state radiation detector according to the invention, the capacitance of the storage capacitor $C_p$ is now selected to be so small as to set up across the storage capacitor $C_p$ a substantially high voltage drop $V_p$ or a sufficient change in voltage $dU=q_p/C_p$ that is caused by the signal charge $q_p$ at the pixel P. This change in voltage is required to be of the order of magnitude of the externally applied voltage $V_{Se}$. Because of this voltage drop and the voltage divider property of the combination of the two capacitances $C_{Se}$ and $C_p$, a reduction is now obtained in the effective voltage across the selenium layer in accordance with the relationship $Veff=V_{Se}-q_p/C_p$. Thus, dependent on the voltage divider properties and the high voltage drop across the storage capacitor, instead of the entire voltage $V_{Se}$ being present, only a substantially reduced voltage fraction is present that is dependent on the magnitude of the voltage reduction which, in turn, depends on the capacitance of the storage capacitor, which was selected to be small.

Assuming, for example, an applied voltage of 2000 V in the case of a selenium layer 200 $\mu$m thick, this corresponds to a field strength of 10 V/$\mu$m. Approximately 400 electron/hole pairs are generated and collected under these conditions by an X-ray quantum with an energy of 20 keV. If, after a sufficiently high radiation dose has been reached, the effective, applied voltage is lowered to, for example, 1000 V or 500 V due to the voltage reduction provided according to the invention, only approximately 200 or approximately 100 electron/hole pairs are still produced in conjunction with a constant energy of the incident X-ray quanta, since a lowering of the field strength present over the selenium layer accompanies the voltage reduction. Consequently, substantially fewer charge carriers are produced and this leads to the output signal becoming nonlinear or sublinear with respect to the radiation dose.

Figure 3:
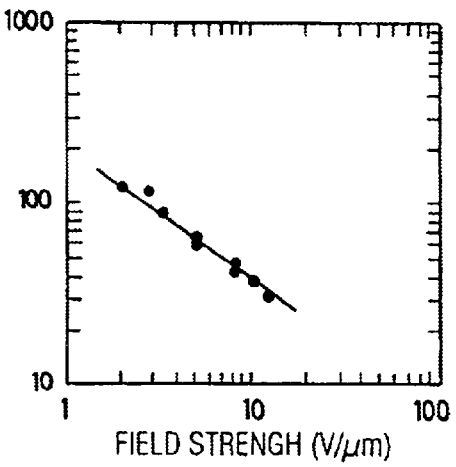
FIG. 3 is a diagram illustrating the required absorbed energy for forming an electron/hole pair in a selenium conversion layer, as a function of the field strength across the selenium layer.
Figure 4:
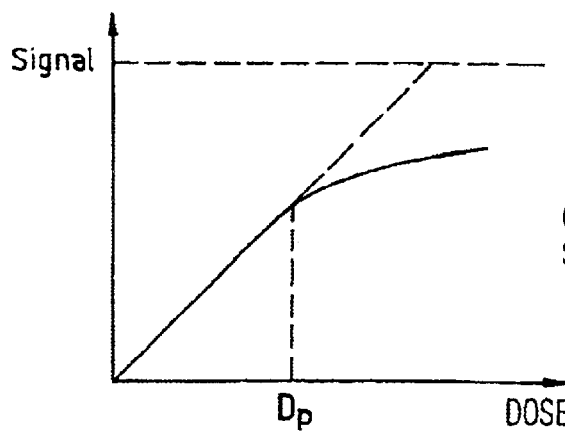
FIG. 4 shows the profile of the pixel-side output signal in relation to the irradiated radiation dose.

These relationships are described graphically in FIGS. 3 and 4. FIG. 3 shows a logarithmic plot of the formation energy in eV required to produce an electron/hole pair against the field strength present over the selenium layer in V/$\mu$m. It can be seen that the formation energy for producing an electron/hole pair increases substantially as the effective field strength is lowered. Consequently, fewer electron/hole pairs are produced in conjunction with a declining field strength, and this lowers the signal. This is shown graphically in FIG. 4, where the output signal is plotted against the radiation dose. In the range of low doses, there is clearly a linear relationship between the signal and the radiation dose which continues linearly up to a specific maximum dose in the case of known solid-state radiation detectors according to the prior art, having a very large capacitance of the storage capacitor. Once this dose has been reached, the output signal suddenly experiences the aforementioned limitation, as shown by the dashed continuation of the linear curve.

The curve profile differs, however, in the case of the solid-state variation detector according to the invention. Here, the curve profile shows a sublinear profile starting from a specific pixel-referred radiation dose $D_p$. The signal no longer increases linearly in direct proportion to the incident radiation dose, but a substantially higher dose is required to increase the signal because of the sublinear relationship. The result of this is that no sudden limiting effect occurs as previously, even in the case of high radiation doses due to unattenuated radiation. This offers the possibility of driving the solid-state radiation detector at a substantially higher level and not only, as previously customary, in the range from approximately 5% to 10%. Conventional operation has been conducted primarily at the lower range near the origin of the linear curve shown, in order to ensure adequate protection against the risk of overdriving. In the case of the solid-state radiation detector according to the invention, the actual drive-level range can be substantially shifted to higher values on the curve.

Figure 5:
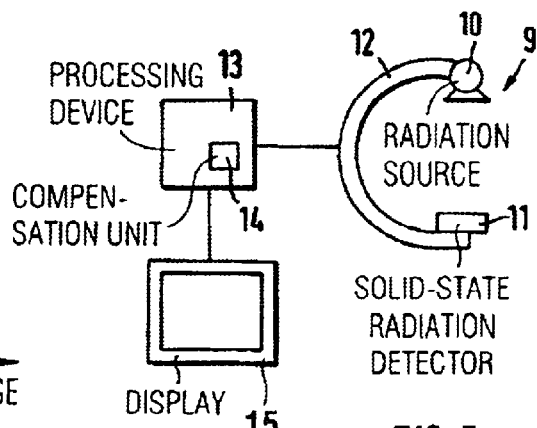
FIG. 5 schematically illustrates an examination and/or treatment device according to the invention.

FIG. 5 shows a basic sketch of a medical examination and/or treatment device 9 according to the invention. This device has a radiation source 10, a solid-state radiation detector 11 according to the invention, and apparatus 12 supporting the two, which can be designed in the form of a C-arm, for example. A processing device 13 is used to control the operation of the radiation source 10 and the solid-state radiation detector 11 which is read out by suitable driving by the processing device 13. The processing device 13 has a compensation unit 14 for compensating the sublinearity that occurs because of the inventive extreme reduction in the capacitance of the storage capacitor $C_p$, so that after the compensation the sublinear output signals can be appropriately compensated and be further processed as a quasi-linear signal using the signals recorded in the linear range. The resulting image is presented at a display 15.

The examination and/or treatment device 9 shown in FIG. 5 is merely of an exemplary nature. Of course, the solid-state radiation detector according to the invention can be used in any radiation device. It is conceivable, for example, to use the detector in mammography, the detector being provided in this case with a selenium layer approximately 200 $\mu$m thick, to which a voltage of approximately 2000 V is applied in order to achieve the regulating field strength of 10 V/$\mu$m. If the detector is used in radiography, where substantially higher doses are used, the selenium layer thickness can be, for example, 600 $\mu$m, and the applied voltage 6000 V. Here, as well, a field strength of 10 V/$\mu$m is then set up over the selenium layer. Field strengths other than 10 V/$\mu$m also can be set.

Although modifications and changes may be suggested by those skilled in the art, it is the intention of the inventor to embody within the patent warranted hereon all changes and modifications as reasonably and properly come within the scope of the inventor's contribution to the art.

We claim as our invention:

1. A solid-state radiation detector comprising:

a pixel matrix comprised of a plurality of pixels;

each pixel in said plurality of pixels supplying an output signal dependent on radiation incident thereon, and having a conversion layer which converts said incident radiation into charge, a storage capacitor for storing said charge, and a transistor for reading out said charge; and said storage capacitor having a sufficiently small capacitance so that, due to a voltage drop across said storage capacitor, the output signal of the pixel exhibits, starting from a specific value of an incident radiation dose, a sublinear response relative to said incident radiation dose.

2. A sold-state state radiation detector as claimed in claim 1 wherein said capacitance of said storage capacitor has a value so that a ratio of a maximum of said voltage drop across the storage capacitor to a maximum of a voltage drop across said conversion layer is 1:10 or greater.

3. A sold-state state radiation detector as claimed in claim 2 wherein said capacitance of said storage capacitor has a value so that said ratio is 1:5 or greater.

4. A sold-state state radiation detector as claimed in claim 1 wherein said transistor is a high-voltage transistor.

5. A sold-state state radiation detector as claimed in claim 1 wherein said conversion layer is a selenium layer, and wherein said transistor is a thin-film transistor.

6. A sold-state state radiation detector as claimed in claim 1 wherein said conversion layer is a selenium layer wherein said transistor is a high-voltage thin-film transistor.

7. A medical device for examination or treatment of a subject, comprising:

a radiation source which emits radiation;

a solid-state radiation detector for detecting said radiation from said radiation source, said solid-state radiation detector comprising a pixel matrix comprised of a plurality of pixels, each pixel in said plurality of pixels supplying an output signal dependent on radiation incident thereon, and having a conversion layer which converts said incident radiation into charge, a storage capacitor for storing said charge, and a transistor for reading out said charge, and said storage capacitor having a sufficiently small capacitance so that, due to a voltage drop across said storage capacitor, the output signal of the pixel exhibits, starting from a specific value of an incident radiation dose, a sublinear response relative to said incident radiation dose; and a processing device supplied with the respective output signals of said pixels, said processing device including a unit for compensating for said sublinear response.

8. A device as claimed in claim 7 wherein said unit is a unit for analytical compensation for said sublinear response.

9. A device as claimed in claim 7 wherein said unit is a look-up table containing a plurality of compensation values.

* * * * *